INVENTOR
PETER BAUER

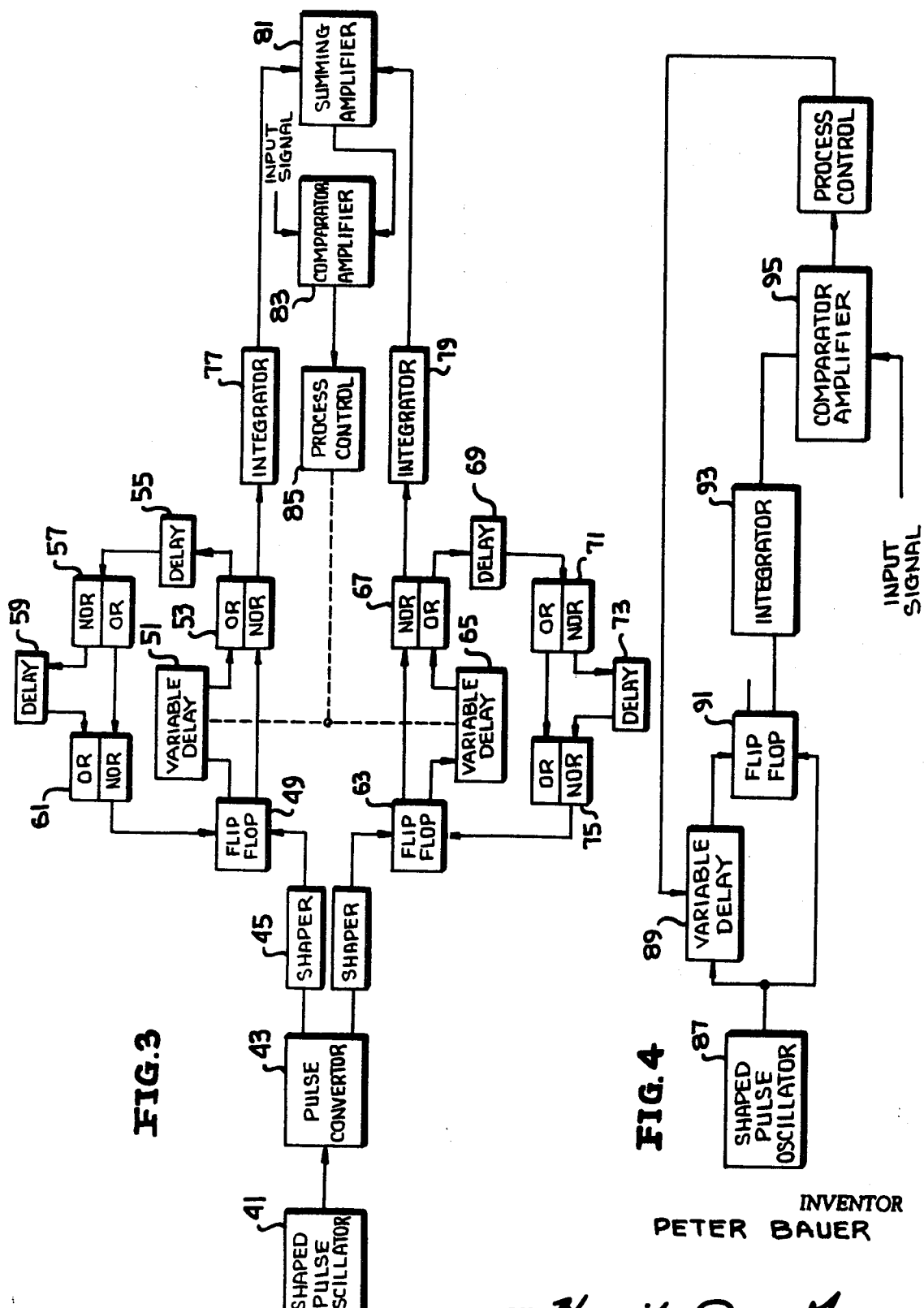

United States Patent Office

3,605,779
Patented Sept. 20, 1971

3,605,779
FLUIDIC CONTROL CIRCUIT
Peter Bauer, Germantown, Md., assignor to Bowles
Fluidics Corporation, Silver Spring, Md.
Filed Mar. 14, 1969, Ser. No. 807,374
Int. Cl. F15c 1/12
U.S. Cl. 137—81.5              12 Claims

ABSTRACT OF THE DISCLOSURE

Fluidic process control is achieved by controllably delaying a fluid signal in response to variations in a process parameter. In a preferred embodiment the controllable delay effects duty cycle variations in a constant frequency alternating fluid signal. Integration of the variable duty cycle signal provides an analog fluid signal as a function of the variable process parameter.

BACKGROUND OF THE INVENTION

The present invention relates to fluidic control systems, and more particularly to such systems in which the duty cycle of a constant frequency signal is employed as a control parameter.

Automatic control systems of the type considered herein compare an input signal with a parameter-responsive signal to provide an error signal for controlling the parameter. The use of fluidic techniques in control systems is known in the prior art, as witnessed by U.S. Pat. No. 3,292,648 describing a Turbine Speed Control System. The system of the present invention is intended primarily for accurately positioning valves or other displaceable elements; however, it will be understood by those familiar with fluidic control systems that a greater variety of control functions may be performed by the system described herein.

It is therefore an object of the present invention to provide a fluidic control system which utilizes fluid signal delay as a control parameter.

It is another object of the present invention to provide a fluidic control system which is ideally suited for valve positioning.

It is still another object of the present invention to provide a simple yet accurate fluidic control system.

SUMMARY OF THE INVENTION

In accordance with the principles of the present invention a fluidic oscillator supplies shaped pulses to a pulse-width modulated shaper to provide a pulse train of variable duty cycle. Modulation of the shaper is achieved by the parameter being controlled. The variable duty pulse train is compared with an input signal, either before or after smoothing, to provide an output signal for controlling the aforesaid parameter.

In a preferred embodiment the shaped oscillator pulses are fed to a fluidic flip-flop which feeds a parameter-responsive variable delay element. Fluidic logic circuitry responds to the delayed flip-flop signal for resetting the flip-flop. In addition, the variable delay is converted to a pulse train having a pulse width equal to the variable delay. The variable width pulses are integrated to provide an analog signal which is compared with an input signal in a fluidic amplifier. The amplifier output signal is suitable for positioning a valve, for example a diaphragm-type valve, the position of which is fed back to control the variable delay.

In an alternative embodiment the shaped oscillator pulses are fed to a fluidic pulse converter which commutates the pulses between two signal lines. One line feeds a parameter responsive variable delay element and the other line feeds directly to the opposite side of the flip-flop. The flip-flop duty cycle is thus a measure of the variable delay and hence of the parameter being controlled. The flip-flop output signal is then compared to an input signal, either before or after smoothing, to provide the error signal for effecting process control.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIG. 3 is a schematic diagram of a modified version of the system of FIG. 1; and FIG. 4 is a schematic diagram of an alternative embodiment of the present invention.

DESCRIPTION OF THE PREFERRED EMBODIMENTS

Figure 1:
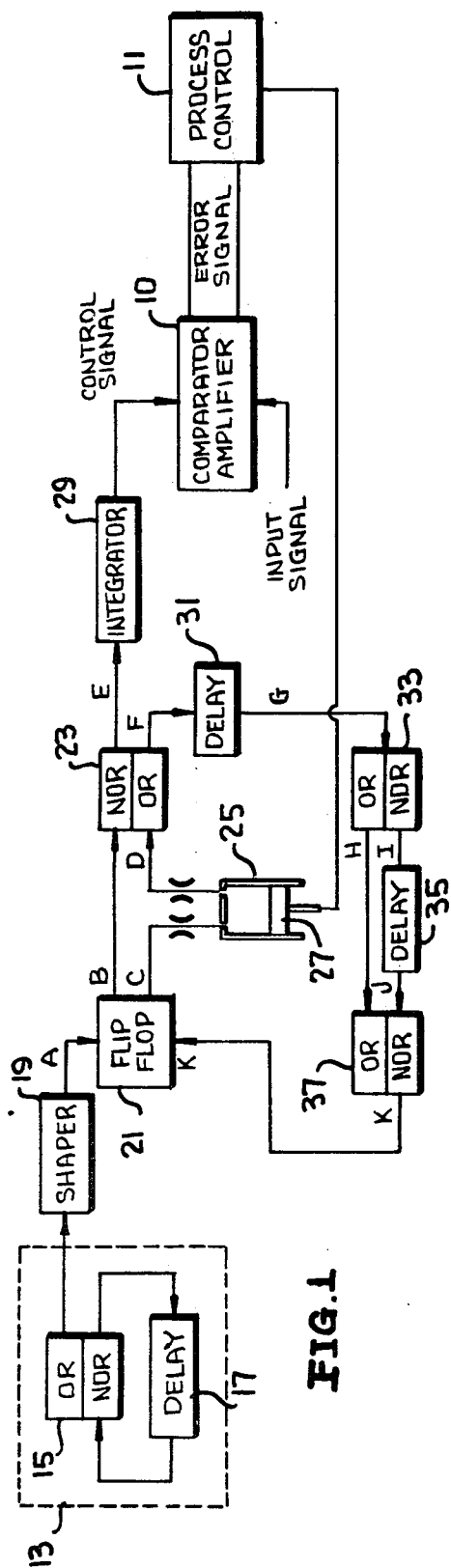
FIG. 1 is a schematic diagram of a preferred embodiment of the present invention.

Referring specifically to FIG. 1 of the drawings there is illustrated a fluidic control system suitable, for example, for accurately positioning a valve. A comparator amplifier 10 provides a differential pressure error signal for positioning the valve in response to the difference between input and control fluid signals. Amplifier 10 may be a proportional fluidic amplifier of the stream interaction types; the controlled valve may, for example, be of the diaphragm type and is designated by block 11 designated "process control" in FIG. 1. The input signal is derived from externally of the circuit of FIG. 1 and may either be operator-initiated or condition-responsive. The control signal is derived from the novel control portion of the circuit.

A fluidic oscillator 13 comprises a fluidic OR/NOR gate 15 and a fluid signal delay element 17 connected in feedback relation between the NOR output passage and an input port of gate 15. OR/NOR gate 15, as well as the other OR/NOR gates described herein, may be of the type illustrated in FIG. 4 of my U.S. Pat. No. 3,286,086. The output signal from oscillator 13 is taken from the OR output passage of gate 15. The operation of oscillator 13 is as follows: in the absence of an input signal to gate 15 the latter assumes its NOR mode, producing an output signal at its NOR passage and none at its OR passage; the NOR passage signal is delayed by element 17 and applied as an input to gate 15 which switches to its OR mode; this produces a signal at the OR passage and removes the signal from the NOR passage; the removal of the NOR signal is reflected at gate 15 after delay by element 17, returning the gate to its NOR mode and repeating the self-oscillatory cycle.

The constant frequency output pulses from oscillator 13 are applied to a fluidic pulse shaper 19 which functions to provide a narrow well-defined fluid pulse in response to each pulse received from the oscillator. A shaper for this purpose is described in copending U.S. patent application Ser. No. 777,695, filed Nov. 21, 1968 and entitled "Leading and/or Trailing Edge Pulse Shaper." The output signal from shaper 19 is designated as signal A for identification in the timing diagram of FIG. 2 to be described subsequently in conjunction with the description of operation of the system of FIG. 1.

Shaper output signal A is applied to a fluidic flip flop 21, which, by way of example, may be of the type illustrated in FIG. 1 of U.S. Pat. No. 3,221,990. Flip flop 21 is a bistable element which provides a fluid signal C upon receipt of signal A, provides fluid signal B upon receipt of a signal K (to be described), and maintains either of signals B or C until receipt of the next occurring one of signals A and K. Signal B is fed directly to an input port of a fluidic OR/NOR gate 23. Signal C is fed to a variable delay element 25 which provides signal D, a delayed version of signal C. Signal D is then applied to another input port of gate 23.

Variable delay element 25 may, by way of example only, be a chamber in which the volume is controllably varied by motion of a piston 26 therein. Piston 26 is translated in the chamber in response to variations of the system parameter being controlled, hence a schematic interconnection between piston 26 and process control block 11 is illustrated in FIG. 1.

In the absence of any input signals thereto gate 23 provides a NOR signal E to integrator 29 which smoothes the pulses applied thereto to provide an analog signal having a pressure which is proportional to the input pulse frequency of signal E or, in the case of constant frequency pulses, to the duty cycle of signal E. The integrator output signal constitutes the control signal applied to comparator amplifier 10.

If one or more input signals are applied to gate 23 the latter provides an OR output signal F which is applied to a fixed delay element 31 which provides a signal G which is a delayed version of signal F. Delay element 31, like delay element 17, may, by way of example, be a fluid passage of sufficient length to produce the desired delay of signal F. The delay requirements for element 31 are discussed in detail below in conjunction with the description of the operation of the system of FIG. 1.

Signal G is fed to an inverter-shaper circuit, comprising an OR/NOR gate 33, delay element 35 and a further OR/NOR gate 37, to provide a signal K which resets flip flop 21. Signal G is applied as the lone input signal to gate 33 which applies its OR output signal H as a direct input signal to gate 37 and its NOR output signal I is fed to delay element 35. The output signal I is fed to delay element 35. The output signal J from element 35 is applied as another input signal to gate 37 from which NOR signal K is derived.

Figure 2:
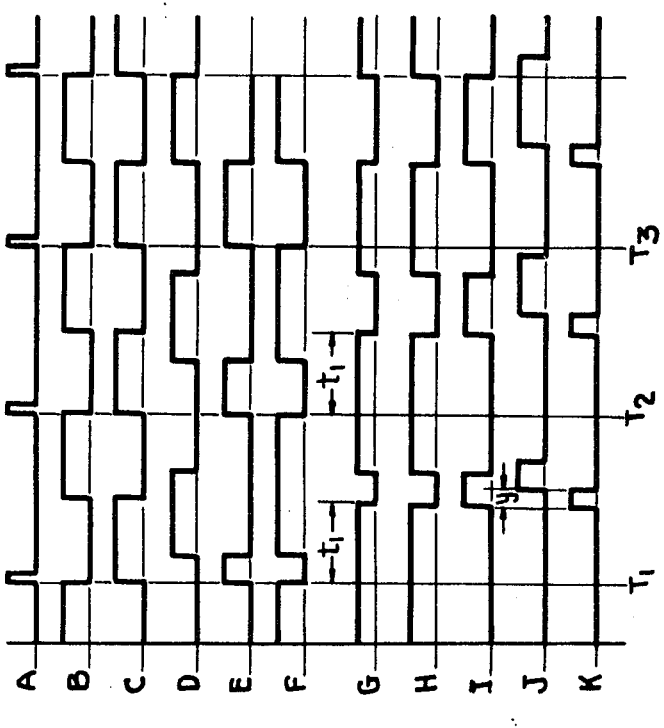
FIG. 2 is a timing diagram illustrating the sequence of operation of the system of FIG. 1.

The operation of the control portion of the circuit of FIG. 1 is best understood when viewed in conjunction with the timing diagram of FIG. 2. The first shaped pulse A is applied to flip-flop 21 at time $T_1$, resulting in a positive signal C being applied to variable delay member 25, and removal of positive signal B from gate 23. Consequently, gate 23 assumes is NOR mode (no positive applied signal) resulting in signal E going positive. At the end of the delay period of member 25 signal D is applied to gate 23, returning the latter to its OR mode in which signal E goes negative and signal F goes positive. However signal G, which is a delayed version of signal F, has not yet gone negative, this being due to the delay encountered in element 31. Element 31, for reasons to be described subsequently, has a delay period which is no greater than one-half the PRF period of signal A. When signal G finally goes negative signal H goes negative and signal J remains negative for a short delay period encountered by the now positive I signal in delay element 35. During this short period when H and J are both negative, gate 37 assumes its NOR mode and provides the reset K signal to reset flip-flop 21 to its B positive state. The period of reset pulse K is equal to the delay period of delay element 35. Flip-flop 21 is now primed for the next A pulse which repeats the cycle beginning at time $T_2$.

The delay period of element 31 and the maximum permissible delay period of member 25 are chosen in accordance with the frequency of the A pulses. More specifically, the total delay between the time flip-flop 21 is switched by an A pulse and the time flip-flop 21 is reset by a K pulse must be less than the PRF period of signal A; otherwise, flip-flop 21 would remain in its C-positive state and not provide a pulse to be width-modulated during each cycle of the A signal. In addition, the delay of element 31 cannot be less than the delay of member 25 in any given cycle; otherwise a reset pulse K would be generated to reset flip-flop 21 before the signal D can switch gate 23 to its OR mode. This would permit signal B to switch gate 23 to its OR mode and the width of the NOR pulse E would not be equal to the delay of member 25. This of course would mean that the control signal applied to comparator amplifier 10 would not be a function of the controlled system parameter.

In order to accommodate the above described interdependence of the system delays and still maximize the useable portion of the PRF period of signal A, the delay $t_1$ through element 31 is chosen to be one-half the period of signal A and the maximum permissible delay through member 25 is likewise chosen to be one-half the period of signal A.

Assuming that at time $T_2$ the delay of member 25 has increased somewhat (to an exaggerated extent in FIG. 2), the following sequence ensues. Signal A switches flip-flop 21, producing another C signal which experience the new and somewhat larger delay in element 25 before, as signal D, it switches gate 23 to its OR mode. The increased delay of member 25 causes a wider NOR pulse E to be generated by gate 23 and more energy is stored in integrator 29 during this cycle than during the interval between $T_1$ and $T_2$. The resetting of flip-flop 21 proceeds as before, with the half cycle delay in element 31 controlling the onset of reset pulse K.

At time $T_3$ it is assumed that member 25 provides its maximum permissible delay. Signal A sets flip-flop 21 to provide the C signal which now experience the maximum delay possible in member 25. The NOR pulse E from gate 23 likewise has its maximum width and energy proportional to this width is stored in integrator 29. More specifically, the generation of signal D ensues one-half cycle after time $T_3$ at which time gate 23 reverts to its OR mode. Reset of flip-flop 21 proceeds as above with signal K generated midway through the signal A cycle.

As is apparent from the above discussion, the maximum utilizable width of NOR pulse E is one-half the period of signal A. If system requirements demand more accuracy than is possible in the FIG. 1 system, resort may be had to the system of FIG. 3 wherein the circuitry of FIG. 1 is substantially duplicated and each half functions over a respective half of the oscillator cycle. The advantage of this arrangement lies in the fact that twice the control information is available per unit time in the FIG. 3 system as compared to the FIG. 1 system. More specifically a shaped pulse oscillator 41 provides a series of constant frequency pulses to a fluidic pulse converter 43. Oscillator 41, for example, may include elements 13 and 19 of FIG. 1 and pulse converter 43 may be of the type disclosed in U.S. Pat. No. 3,001,698. Pulse converter 43 serves to receive the series of pulses from oscillator 41 and commutate these pulses alternately to two respective lines which feed respective pulse shapers 45 and 47. For purposes of FIG. 3, if the frequency of oscillator 41 is twice that of oscillator 13 in FIG. 1, the amount of control information received by the system of FIG. 3 per unit of time is twice that of the system of FIG. 1. If the frequency of oscillator 13 were doubled in the system of FIG. 1 the amount of control information received per unit of time would remain the same since the control information could still be sampled only over one half of each cycle, the cycles being doubled in number but halved in size.

The output pulses from shaper 45 feed one half of the system which comprises flip-flop 49, variable delay element 51 and OR/NOR gate 53, corresponding to flip-flop 21, member 25, and gate 23 in FIG. 1. Reset of flip-flop 49 is accomplished via delay element 55, OR/NOR gate 57, delay element 59, and OR/NOR gate 61 which correspond respectively to delay element 31, gate 33, delay element 35 and gate 37 of FIG. 1. In like manner shaper 47 feeds a duty cycle modulator comprising flip-flop 63, variable delay element 65 and OR/NOR gate 67, and having flip-flop reset circuitry comprising delay element 69, OR/NOR gate 71, delay element 73, and OR/NOR gate 75.

The NOR output signals from respective gates 53 and 67 feed respective integrators 77 and 79, the output signals from which are fed to a fluidic summing amplifier 81. The latter provides a fluid output signal which is proportional to the sum of the two integrator output signals. This output signal is compared to a system input signal at comparator amplifier 83 and the resulting difference signal is fed to the process control element 85 which controls variable delay elements 51 and 65 in accordance with the present condition of the controlled parameter.

The operation of each half of the system of FIG. 3 follows in a manner similar to that of the system in FIG. 1. The variable delay members 51 and 65 always provide equal delay to their respective input signals so that each half of the system alternately samples the condition of the controlled parameter. Thus, the portion of the system feeding integrator 77 is capable of providing a NOR pulse from gate 53 with a maximum width of one-half the period of the pulse train provided by shaper 45. Similarly, the other half of the system is capable of feeding NOR pulses from gate 67 having a maximum width of one-half the period of the pulse train provided by shaper 47. Since the pulses from shapers 45 and 47 are interlaced, each half of the system provides its parameter-responsive NOR pulses during the "dead" or off time of the other half of the system. The system of FIG. 3 thus efficiently utilizes the half of the oscillator cycle which is "wasted," in the information-gathering sense, in FIG. 1.

Referring now to FIG. 4 of the accompanying drawings there is illustrated an alternative embodiment of the system of FIG. 1, operative to sample parameter condition information over the entire portion of the oscillator cycle. A shaped pulse oscillator 87 applies narrow, well-defined pulses at a constant frequency to each of a variable delay member 89 and one input port of a flip-flop 91. The opposite input port of flip-flop 91 is fed by the variable delay member output signal.

One output passage of flip-flop 91 is connected to integrator 93; specifically, the output passage in question is that which provides a positive pressure signal in response to an input signal from variable delay member 89. The integrator in turn feeds a control signal to comparator amplifier 95 which compares the control signal with an input signal and provides an error signal as a function of the difference. The error signal feeds the process control unit which also sets the variable delay member 89 in accordance with the present condition of the controlled parameter.

In operation, an input pulse from oscillator 87 switches flip-flop 91 so that no signal is applied to integrator 93. After being delayed through member 89 the same input pulse re-switches flip-flop 91 and a signal is restored at integrator 93. The next input pulse causes the flip-flop to remove the flip-flop signal from the integrator until the delayed pulse passes through member 89. The cycle is repetitive with flip-flop 91 completing one full cycle during each oscillator period. The duty cycle of the flip-flop is modulated by the variable delay element 89 which is responsive to the condition of the controlled parameter. Thus the control signal applied to comparator amplifier 95 from integrator 93 is a measure of the controlled parameter.

The limitation on the maximum delay of member 89 is that it must be at least slightly smaller than the period of oscillator 87; otherwise the delay period would overlap the next oscillator pulse and parameter condition information would not be available on a cycle to cycle basis.

It is to be understood that the chamber and piston arrangement illustrated as delay member 25 in FIG. 1 is merely an example of a delay member suitable for use in the present system. Another variable delay arrangement which would likewise be suitable is the digital delay line arrangement disclosed in U.S. Pat. No. 3,075,548.

The integrator described herein may, by way of example, comprise fluidic capacitors having restricted inlet ports. Integration of the control signal in FIGS. 1, 3 and 4 need not take place before application of the signal to the comparator amplifier. Instead, the input signal may be compared to the variable-width pulse train and the resulting signal integrated for use process control.

While I have described and illustrated specific embodiments of my invention, it will be clear that variations of the details of construction which are specifically illustrated and described may be resorted to without departing from the true spirit and scope of the invention as defined in the appended claims.

I claim:

1. In a system having a variable parameter, a fluidic control circuit for providing a fluid signal as a function of said parameter, said circuit comprising:
   first means for supplying a cyclical fluid signal at constant frequency; and
   control means for varying the duty cycle of said cyclical signal as a function of said variable parameter;
   wherein said first means comprises a fluidic flip-flop having stable set and reset states and pulse generator means for cyclically setting and resetting said flip-flop at said constant frequency;
   wherein said control means comprises means for variably delaying resetting of said flip-flop as a function of said variable parameter;
   wherein said pulse generator means provides a train of fluid pulses at said constant frequency and includes means for applying each pulse of said train directly to said flip-flop for setting said flip-flop; and
   wherein said means for variably delaying comprises a variable signal delay element for delaying fluid signals applied thereto as a function of said variable parameter and means for interconnecting said variable signal delay element between said pulse generator means and said flip-flop for resetting said flip-flop with each pulse in said train after a delay determined by said variable delay element, whereby the duty cycle of said flip-flop is a function of said variable parameter.

2. The circuit according to claim 1 wherein said flip-flop provides a fluid output signal when in one of said stable states and wherein said circuit further comprises means for integrating said fluid output signal from said flip-flop.

3. In a system having a variable parameter, a fluidic control circuit for providing a fluid signal as a function of said parameter, said circuit comprising:
   first means for supplying a cyclical fluid signal at constant frequency; and
   control means for varying the duty cycle of said cyclical signal as a function of said variable parameter;
   wherein said first means comprises pulse generator means for providing a train of fluid purses at said constant frequency; and wherein said control means comprises a fluidic flip-flop having stable set and reset states for providing a first fluid signal when in said set state, means for applying each pulse in said train to said flip-flop for switching said flip-flop to said set state, variable signal delay means for receiving and delaying said first fluid signal as a function of said variable parameter, means for switching said flip-flop to said reset state at a predetermined time after setting of said flip-flop, said predetermined time being shorter than the period of said pulse train, and fluidic gating means for providing a fluid signal only during the time interval between setting of said flip-flop and completion of the delay of said first fluid signal by said variable signal delay means.

4. The circuit according to claim 3 wherein said predetermined time is equal to approximately one-half the period of said pulse train, and wherein the maximum operable delay provided by said variable signal delay means is one-half cycle of said pulse train.

5. The circuit according to claim 4 further comprising means for integrating said first fluid signal to provide an analog fluid signal as a function of said variable parameter.

6. In a system having a variable parameter, a fluidic control circuit for providing a fluid signal as a function of said parameter, said circuit comprising:

first means for supplying a cyclical fluid signal at constant frequency; and control means for varying the duty cycle of said cyclical signal as a function of said variable parameter; wherein:

said first means comprises a fluid pulse generator for providing a train of fluid pulses at said constant frequency, and fluidic pulse converter means for communicating alternate pulses of said train on two separate lines;

said control means comprises two substantially identical fluidic circuits, each fed by a respective one of said two separate lines, said identical fluidic circuits each comprising: a fluidic flip-flop having stable set and reset states and providing a first fluid signal when in said set state, means for setting said flip-flop in response to each pulse on said respective one of said two separate lines, means for resetting said flip-flop at a predetermined time after setting of said flip-flop, variable signal delay means for receiving and delaying said first fluid signal as a function of said variable parameter, and fluidic gating means for providing a fluid output signal only during the time interval between setting of said flip-flop and completion of the delay of said first fluid signal by said variable signal delay means; and said control means further comprising means for combining said fluid output signals from each of said identical fluidic circuits to provide said fluid signal as a function of said variable parameter.

7. A fluidic control system for controlling a predetermined variable parameter in response to a fluid input signal, said system comprising:

a fluidic comparator amplifier for providing a fluid output signal as a function of the difference between two fluid input signals;

means responsive to said fluid output signal for controlling said variable parameter;

means for applying said fluid input signal as one of said two fluid input signals to said amplifier;

control means for providing a fluid control signal as the second of said two input signals to said amplifier, said control means comprising first means for providing a cyclical fluid signal at constant frequency, delay means for varying the duty cycle of said cyclical signal as a function of said variable parameter, fluidic gating means responsive to variations in the duty cycle of said cyclical fluidic signal for providing a fluid pulse during each cycle of said cyclical fluid signal, said fluid pulse having a width which is a function of duty cycle variation in said cyclical fluid signal; and means for providing said fluid control signal at an amplitude proportional to the width of said fluid pulse.

8. A fluidic circuit for controlling the position of a movable member, said circuit comprising:

means for providing a train of fluid pulses at constant frequency;

variable delay means including a chamber having an input port and an output port and means for varying the volume of said chamber in response to variations in the position of said movable member;

bistable fluidic means having first and second stable states assumed in response to application thereto of first and second fluid signals, respectively;

means for applying each pulse in said pulse train to said bistable fluidic means as said first fluid signal;

means for applying each pulse in said pulse train to said input port of said chamber;

means for conducting pulses delayed in said chamber from said output port to said bistable fluid means as said second fluid signal; and output means for controlling the position of said movable member as a function of the proportion of time said bistable fluidic means is in said first stable state.

9. The circuit according to claim 8 wherein said output means comprises:

means for providing a constant amplitude fluid signal whenever said bistable fluidic means is in said first stable state;

means for integrating said constant amplitude fluid signal to provide an analog fluid signal of amplitude proportional to the proportion of time said bistable fluidic means is in said first stable state; and means responsive to the amplitude of said analog fluid signal for positioning said movable member.

10. A fluidic circuit for controlling the position of a movable member, said circuit comprising:

a pulse generator for providing a train of fluid pulses at a constant frequency;

a bistable fluidic element having first and second input ports, first and second output ports, a first stable state assumed in response to a fluid pulse applied to said first input port and in which a fluid signal is provided at said first output port, and a second stable state assumed in response to a fluid pulse applied to said second input port;

means for applying each pulse in said train to said first input port;

variable signal delay means having first and second signal ports for delaying transmission of signals from said first signal port to said second signal port as a function of the position of said movable member;

means for applying fluid signals from said first output port of said bistable fluidic element to said first signal port of said variable signal delay means;

reset means responsive to fluid signals transmitted to said second signal port of said variable delay means for applying a fluid pulse to said second input port of said bistable fluidic element; and output means responsive to the proportion of each cycle of said pulse train during which said bistable fluidic element is in said first stable state for controlling the position of said movable member.

11. The circuit according to claim 10 wherein said bistable fluidic element provides a fluid signal at said second output port when in said second stable state, and wherein said output means comprises:

a two-input fluidic OR/NOR gate for providing a NOR fluid signal in response to the absence of fluid signal from both said two inputs and for providing an OR fluid signal in response to the presence of fluid signal at one or both said two inputs;

means for connecting said second signal port of said variable signal delay means and said second output port of said bistable fluidic element to said two input ports, respectively;

integrator means for receiving said NOR signal and providing an analog fluid signal having an amplitude proportional to the duty cycle of said NOR signal; and means for controlling the position of said movable member in proportion to the amplitude of said analog fluid signal.

12. The circuit according to claim 11 wherein said reset means includes means responsive to each OR signal pulse for applying a fluid to said second input port.

References Cited

UNITED STATES PATENTS

| 3,491,797 | 1/1970 | Taplin et al. | 137—81.5 |
| 3,502,094 | 3/1970 | Johnson | 137—81.5 |
| 3,175,569 | 3/1965 | Sowers, III | 235—201PF |
| 3,228,602 | 1/1966 | Boothe | 137—81.5X |
| 3,238,959 | 3/1966 | Bowles | 137—81.5 |
| 3,241,758 | 3/1966 | Gobhai | 235—201PF |
| 3,260,271 | 7/1966 | Katz | 137—81.5X |
| 3,273,377 | 9/1966 | Testerman et al. | 235—201PF |
| 3,463,176 | 8/1969 | Lazar | 25—201PF |
| 3,481,351 | 12/1969 | Reilly et al. | 137—81.5 |
| 3,489,181 | 1/1970 | Boothe | 235—201PF |

SAMUEL SCOTT, Primary Examiner